United States Patent
Dargent

(10) Patent No.: US 9,399,528 B2
(45) Date of Patent: Jul. 26, 2016

(54) METHOD AND SYSTEM FOR STATIONING A SATELLITE

(71) Applicant: THALES, Neuilly-sur-Seine (FR)

(72) Inventor: Thierry Dargent, Auribeau-sur-Saigne (FR)

(73) Assignee: Thales, Courbevoie (FR)

( * ) Notice: Subject to any disclaimer, the term of this patent is extended or adjusted under 35 U.S.C. 154(b) by 198 days.

(21) Appl. No.: 14/093,370

(22) Filed: Nov. 29, 2013

(65) Prior Publication Data
US 2014/0166814 A1 Jun. 19, 2014

(30) Foreign Application Priority Data
Nov. 30, 2012 (FR) .................... 12 03243

(51) Int. Cl.
*B64G 1/24* (2006.01)
*B64G 1/00* (2006.01)
*G05D 1/10* (2006.01)

(52) U.S. Cl.
CPC ............... *B64G 1/242* (2013.01); *B64G 1/007* (2013.01); *G05D 1/10* (2013.01)

(58) Field of Classification Search
CPC ...................................................... B64G 1/26
USPC ............ 244/158.4, 158.5, 158.6, 158.8, 164; 701/13
See application file for complete search history.

(56) References Cited

U.S. PATENT DOCUMENTS

| | | | | | |
|---|---|---|---|---|---|
| 5,349,532 A * | 9/1994 | Tilley | ...................... | B64G 1/26 | 244/164 |
| 5,595,360 A * | 1/1997 | Spitzer | ................... | B64G 1/007 | 244/158.5 |
| 5,984,236 A * | 11/1999 | Keitel | ...................... | B64G 1/24 | 244/164 |
| 6,253,125 B1 * | 6/2001 | Barker | ................... | B64G 1/288 | 244/158.1 |
| 6,293,501 B1 * | 9/2001 | Kurland | ................. | B64G 1/281 | 244/164 |
| 6,305,646 B1 * | 10/2001 | McAllister | ............. | B64G 1/242 | 244/158.8 |
| 6,543,723 B1 * | 4/2003 | Oh | ......................... | B64G 1/007 | 244/158.5 |
| 6,637,701 B1 * | 10/2003 | Glogowski | ............. | B64G 1/242 | 244/164 |
| 6,695,263 B1 * | 2/2004 | Goodzeit | ............... | B64G 1/361 | 244/164 |
| 6,845,950 B1 | 1/2005 | Goodzeit et al. | | | |
| 7,246,775 B1 | 7/2007 | Goodzeit et al. | | | |
| 2010/0179711 A1 * | 7/2010 | Munir | .................... | B64G 1/242 | 701/13 |
| 2012/0097796 A1 * | 4/2012 | Munir | .................... | B64G 1/007 | 244/158.6 |
| 2012/0097797 A1 * | 4/2012 | Woo | ....................... | B64G 1/242 | 244/158.6 |

FOREIGN PATENT DOCUMENTS

EP      1076005 A2    2/2001

* cited by examiner

*Primary Examiner* — Justin Benedik
(74) *Attorney, Agent, or Firm* — Baker & Hostetler LLP

(57) ABSTRACT

A method for stationing a satellite, comprises: determining a predefined trajectory for stationing of the satellite based on a model of movement of the satellite; determining parameters of the predefined control law of approximation of the trajectory and by minimizing impact on the control law of deviation from a trajectory followed by the satellite using parameters of the control law; determining a state vector of the satellite; determining a deviation between the state vector and the predefined trajectory; determining Lagrange multipliers based on a current state vector of the satellite, on a deviation between current state vector and predefined trajectory and on parameters of the predefined control law; determining parameters of the current control law of the engines based on the Lagrange multipliers and by derivation of a parameter representative of an effect of engines on the real trajectory; and controlling engines based on parameters of the current control law.

7 Claims, 3 Drawing Sheets

METHOD AND SYSTEM FOR STATIONING A SATELLITE

CROSS-REFERENCE TO RELATED APPLICATIONS

This application claims priority to foreign French patent application No. FR 1203243, filed on Nov. 30, 2012.

FIELD OF THE INVENTION

The present invention relates to the stationing or orbit transfer of satellites using engines with weak thrust and whose stationing or orbit transfer is carried out by a large number of orbit revolutions. These low-power engines are, for example, engines in which the ionization of the propellant gas is effected electrically. These engines are also known, in the prior art, by the name of electric engines. Engines in which the ionization of the propellant gas is effected chemically are themselves known, in the prior art, by the name of chemical engines.

BACKGROUND

These electric engines make it possible to limit the fuel mass necessary to effect the orbit transfer operation of the satellite. However, as these engines are of very low power, they have the drawback of lengthening the stationing or orbit transfer time by one to two orders of magnitude, compared with the use of chemical engines.

By virtue of this low power and the elongation of the transfer or stationing time, the control methods, which determine the thrust law of the engine (direction and amplitude as a function of time), used for chemical engines, are not applicable to electric engines.

Control methods for electric engines, known in the prior art, are either able to be carried out in the satellite without being optimal, or are optimal but require extensive operations to be carried out on the ground, these operations also being closely spaced in time. Moreover, in the event of these methods being used, any cessation of the control method or any cessation of the engine makes it necessary to start the computation again and to reschedule all of the control operations.

Control methods, carried out in the satellite, are based on a considerable simplification of the control method, and a fixed control structure is chosen, with most of the time a fixed type of orbit. One example is the use of a synchronous highly eccentric departure orbit and an inertial fixed control law. Similarly, other methods propose using a fixed control structure for transfers towards standard geostationary orbits (also known by the acronym GTO for Geostationary Transfer Orbit). By limiting the degrees of freedom fixed by the imposed control structure the determination of the control law is suboptimal. This is why the fixed control methods differ in construction from the optimal control law, which could have been determined in a continuous manner. They are therefore more expensive in fuel terms and are not more robust to disturbances and therefore require the regular rescheduling of control parameters.

SUMMARY OF THE INVENTION

The invention therefore proposes a method that can be carried out on board the satellite (in particular a method with memory and computational resource needs compatible with the performance of a satellite). This method makes it possible to determine the optimal control law whatever the departure and arrival orbit of the satellite. The control method is robust to mission interruptions, such as the interruption of the piloting for maintenance, breakdowns etc. The control method is capable of correcting the optimal control law automatically in a closed loop with simple computations and without reprogramming from the ground. Finally, this solution makes it possible to carry out a stand-alone orbit transfer and is suitable for the use of electric engines.

With this aim, the subject of the invention is a method for stationing a satellite, characterized in that it comprises a first step of determining a predefined trajectory used for said stationing of said satellite based on a model of the movement of said satellite, and a second step of determining the parameters of the predefined control law of approximation of said predefined trajectory and by minimizing the impact on said predefined control law of a deviation from a trajectory followed by said satellite using said parameters of the predefined control law. Moreover, the method also comprises the following iterative steps: a third step of determining a state vector of the satellite, a fourth step of determining a deviation between said state vector of the satellite and said predefined trajectory, a fifth step of determining Lagrange multipliers based on a current state vector of said satellite, on a deviation between said current state vector and the predefined trajectory and on said parameters of the predefined control law, a sixth step of determining the parameters of the current control law of the engines based on said Lagrange multipliers and by derivation of a parameter representative of an effect of the engines on said real trajectory, and a seventh step of controlling the engines based on said parameters of the current control law.

A state vector makes it possible to characterize a dynamic system in vectorial form using state variables. State variables, at a given instant, are quantities which completely define the state of the dynamic system at this instant. These quantities mostly have a physical significance. The knowledge of the state vector at any instant t makes it possible to know the state over an interval [t, t+T], by integration over time between t and t+T of the dynamics of the state vector. T is an arbitrary variable. The number of state variables, denoted by the letter n, is the dimension of the system.

The invention provides an effective and robust method for creating on board a satellite the predefined control law minimizing the journey time or the fuel consumption during the stationing or the orbit transfer of the satellite. The proposed method is optimal in the sense that the performance of the law created is equivalent to the theoretical law. The resources, in terms of quantity of available memory and computational power necessary to the operation of the method, are low in comparison with the computer resources of current satellites. The method is said to be robust, because it withstands mission hazards without the need for reprogramming, and withstands mission interruptions. To do this the method creates a closed-loop mechanism for permanently adapting the predefined control law as a function of deviation from the nominal trajectory.

Advantageously the parameters of the predefined control law and/or the predefined trajectory are stored in the form of a polynomial representation.

Advantageously the first step and/or the second step of determination use an averaged model of the movement of said satellite.

Advantageously said first step is adapted for using a Cartesian model of the movement of said satellite.

Advantageously said first step is adapted for using a Keplerian model of the movement of said satellite.

Advantageously said first step is adapted for using an equinoctial model of the movement of said satellite.

The invention also relates to a satellite comprising at least one engine and engine control means adapted for implementing the method described in the invention.

BRIEF DESCRIPTION OF THE DRAWINGS

The invention will be better understood and other advantages will appear on reading the detailed description of the embodiments, given by way of example in the following figures.

DETAILED DESCRIPTION

Figure 1:
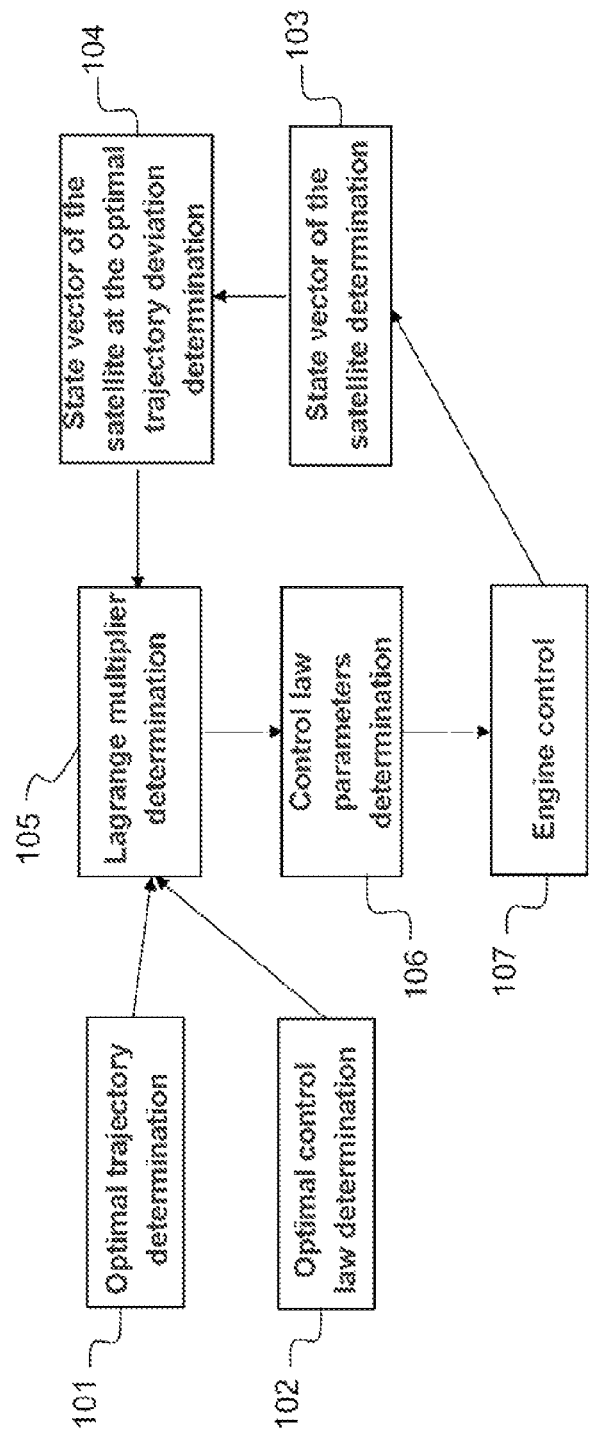
FIG. 1 shows the method according to one aspect of the invention.
Figure 2:
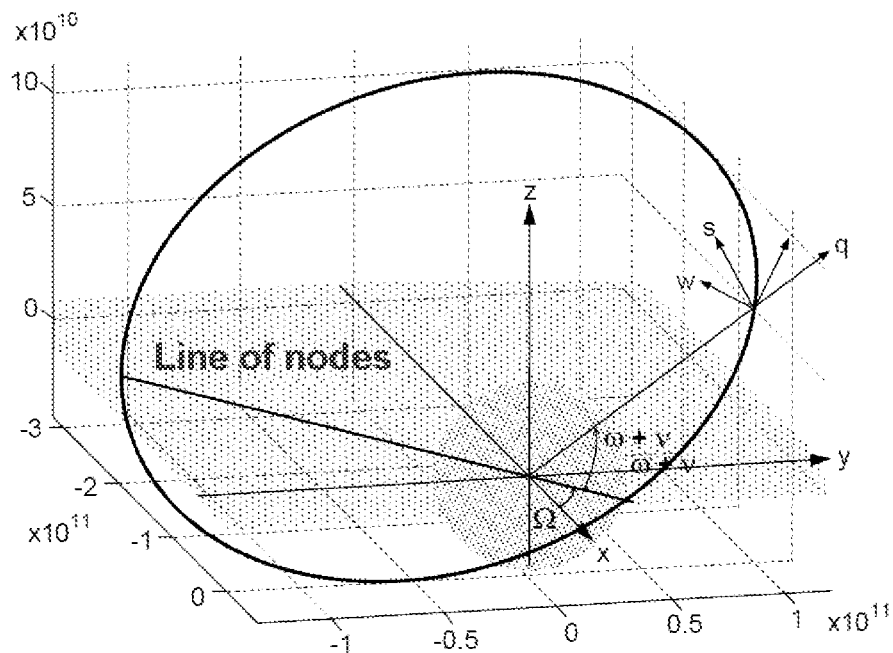
FIG. 2 shows the various parameters used in the representation of the movement of the satellite.

The method, as shown in FIG. 1, can use various models of the spatial evolution of the satellite.

A first model uses a Cartesian representation. A Cartesian representation is a representation in position and in velocity. This first model uses the following equations:

$$\frac{d^2 \vec{r}}{dt^2} = -\mu \frac{\vec{r}}{r^3} + \frac{F}{m} \vec{\beta} + \frac{\vec{F}_{disturbing}}{m}$$

$$\frac{dm}{dt} = -\frac{F}{g_0 \times I_{sp}}$$

In these equations the various variables represent the following elements:

$\vec{r}$ vector radius of the satellite in relation to the center of Earth in meters $\vec{\beta}$ vector of the thrust-directing cosines F engine thrust (F≥0) in Newtons $I_{sp}$ specific impulse of the engine in seconds m mass of the satellite in kilograms $\mu$ gravitational constant 3.986005 E+14 $m^3/s^2$ for the Earth $g_0$ normalized terrestrial acceleration 9,80665 $m/s^2$ $\vec{F}_{disturbing}$ set of disturbing forces affecting the trajectory of the satellite in Newtons The disturbing forces, acting on the satellite, are involved to the second order in the modifications of the satellite trajectory. At first, their actions are therefore neglected and treated as disturbances by the closed-loop control.

Writing the velocity as $d\vec{r}/dt = \vec{v}$ the equations of the dynamics of the satellite can be written in the form of a first-order non-linear differential equation system:

$$\begin{cases} \frac{d\vec{r}}{dt} = \vec{v} \\ \frac{d\vec{v}}{dt} = -\mu \frac{\vec{r}}{r^3} + \frac{F}{m}\vec{\beta} + \frac{\vec{F}_{disturbing}}{m} \\ \frac{dm}{dt} = -\frac{F}{g_0 \times I_{sp}} \end{cases}$$

-continued $$\begin{bmatrix} \vec{r} \\ \vec{v} \\ m \end{bmatrix}$$

denotes the state vector of the system that makes it possible to have a Cartesian representation of the dynamics of the satellite.

A second model uses a Keplerian representation. In this model, the equation of the dynamics of the satellite is transformed to express the movement of the satellite in terms of elements of Keplerian type. These Keplerian elements are the semimajor axis a, the eccentricity e, the longitude of the perigee $\omega$, the longitude of the ascending node $\Omega$ and the true anomaly $v$. This modelling method offers the advantage of being able to be directly interpreted by those skilled in the art. Indeed, it directly expresses the geometric elements of the orbit of the satellite. Moreover, five of the six parameters are first integrals of movement, which allows a simple numerical implementation. The state vector in this set of coordinates is $x=[a,e,i,\omega,\Omega,v,m]$.

A third model is the equinoctial model. This model uses coordinates of which the parameters are p, $e_x$, $e_y$, $h_x$, $h_y$, and l:

p is the parameter of the conic, $[e_x, e_y]$ represents the eccentricity vector and $[h_x, h_y]$ the inclination vector. The state vector in this set of coordinates is $x=[p, e_x, e_y, h_x, h_y, l, m]$.

Unlike the Keplerian model, the state dynamics of the equinoctial model do not exhibit singularity, either for equatorial orbits (i=0°) or polar orbits (i=90°). Moreover, the state dynamics are valid for elliptic and hyperbolic orbits simultaneously.

The parameters of the equinoctial model are expressed based on the Keplerian parameters by the following equations:

$$p = a|1 - e^2| \text{ in meters}$$
$$e_x = e \times \cos(\omega + \Omega)$$
$$e_y = e \times \sin(\omega + \Omega)$$
$$h_x = \tan\frac{i}{2}\cos(\Omega)$$
$$h_y = \tan\frac{i}{2}\sin(\Omega)$$
$$l = \omega + \Omega + v \text{ in radians}$$

In these equations, the various elements represent:

a the semimajor axis in meters e the eccentricity i the inclination in radians $\Omega$ the longitude of the ascending node in radians $\omega$ the argument of the perigee in radians $v$ the true anomaly in radians Using the equinoctial model, the equations of the dynamics of the satellite are the following equations:

$$\frac{dp}{dt} = 2\sqrt{\frac{p^3}{\mu}} \frac{1}{Z} S$$

$$\frac{de_x}{dt} = \sqrt{\frac{p}{\mu}} \frac{1}{Z}(Z \times \sin(l) \times Q + A \times S - e_y \times F \times W)$$

-continued $$\frac{de_y}{dt} = \sqrt{\frac{p}{\mu}} \frac{1}{Z}(-Z \times \cos(l) \times Q + B \times S + e_x \times F \times W)$$

$$\frac{dh_x}{dt} = \frac{1}{2}\sqrt{\frac{p}{\mu}} \frac{X}{Z}\cos(l) \times W$$

$$\frac{dh_y}{dt} = \frac{1}{2}\sqrt{\frac{p}{\mu}} \frac{X}{Z}\sin(l) \times W$$

$$\frac{dl}{dt} = \sqrt{\frac{\mu}{p^3}} Z^2 + \sqrt{\frac{p}{\mu}} \frac{1}{Z} \times F \times W$$

$$\frac{dm}{dt} = -\frac{T}{g_0 \times I_{sp}}$$

In these equations, the various parameters without units are defined by:

$Z=1+e_x \cos(l)+e_y \sin(l)$ $A=e_x+(1+Z)\cos(l)$ $B=e_y+(1+Z)\sin(l)$ $F=h_x \sin(l)-h_y \cos(l)$ $X=1+h_x^2+h_y^2$ and Q, S and W are the radial, tangential and normal components of the acceleration delivered by the engine and/or the disturbing forces.

Since the dynamics of the satellite evolve slowly because of the weak thrust of the engines, it is beneficial to view the dynamics as a parameter of the average state over one orbit instead of dealing with parameters of instantaneous state, as in the preceding equations.

The averaging operation is carried out with the following formula:

$$\bar{x} = \bar{f} = \frac{1}{T}\int_0^T f(x, u^*)dt = \frac{1}{T}\int_0^{2\pi} f(x, u^*) \frac{1}{\left(\frac{dl}{dt}\right)} dl$$

$$T = \int_0^{2\pi} \frac{1}{\left(\frac{dl}{dt}\right)} dl$$

where f is the satellite dynamics, a function of the state x and of the control u* and T is the period of the orbit. Averaging makes it possible to obtain a smoother representation of the orbital parameters, which can be represented more easily by polynomials.

The control method, shown in FIG. 1, comprises a first step 101 of determining the predefined trajectory. This determination is carried out using optimal control theory by applying the maximum principle to one of the satellite dynamics models. This application of the maximum principle makes it possible to compute the optimal trajectory according to the chosen criterion of optimality: conventionally, trajectory in a minimum time or trajectory at a fixed duration and with a minimum fuel consumption. This step makes it possible to obtain an optimal predefined trajectory that is a function of time t, the representative parameters of which are t $x_{ref}(t)$ and $\lambda_{ref}(t)$. $x_{ref}(t)$ is the state vector of the satellite dynamics (for example $x_{ref}(t)=[p(t), e_x(t), e_y(t), h_x(t), h_y(t), l(t), m(t)]$ and $\lambda_{ref}(t)$ are the Lagrange multipliers associated with the state vector in application of the minimum principle (for example $\lambda_{ref}(t)=[\lambda_p(t),\lambda_{e_x}(t),\lambda_{e_y}(t),\lambda_{h_x}(t),\lambda_{h_y}(t),\lambda_l(t),\lambda_m(t)]$).

The method also comprises a second step 102 of determining the parameters of the predefined control law. This determination is carried out by computing the sensitivity matrix $A(t)=\partial\lambda(t)/\partial x$. This matrix represents the sensitivity of the reference adjunct state λ with respect to the state along the reference optimal trajectory.

The determination of this reference data is carried out, for example, using Pontryagin's maximum principle. This principle allows an optimization of continuous systems with state variable functions defined at the final instant and at a specified or unspecified final time (including the problem in minimum time).

Ψ is the constraint function of the final state (target orbit):

$\Psi[x(t_f),t_f]=0$

J denotes the cost function increased by the constraints:

$\bar{J}=\Phi[x(t_f),t_f]+\nu^T\Psi[x(t_f),t_f]+\int_{t_0}^{t_f}L[x,u,t]+\lambda^T(f(x,u,t)-\dot{x})dt$ In this equation the parameters are as follows:

Φ the terminal cost function, for example Φ=m if the fuel consumption is optimized and Φ=0 if the journey time is optimized.

L the cost function along the trajectory, for example L=0 if the fuel consumption is optimized and L=1 if the journey time is optimized.

f the satellite dynamics depending on the state x of the control u and on the time t. The control u is composed of 3 parameters determining the engine thrust (for example the direction of thrust and a Boolean that controls the ignition of the engine)

ν the Lagrange multiplier associated with the constraint Ψ

λ the Lagrange multiplier associated with the dynamics

Also H denotes the Hamiltonian of the problem $H=\lambda^T \times f$. The necessary conditions for making the problem optimal (i.e. that J be an extremum) is that the differential of J be null ($\partial J=0$).

After computation, this gives the following equations:

$\dot{x}=f(x,u,t)$ with $x(t_0)$ given and $t_0 \leq t \leq t_f$ $$\dot{\lambda} = -\left(\frac{\partial f}{\partial x}\right)^T \lambda - \left(\frac{\partial L}{\partial x}\right)^T$$

If state dynamics averaged over one orbit are used the equations are:

$$\bar{x} = \bar{f} = \frac{1}{T}\int_0^T f(x, u^*)dt = \frac{1}{T}\int_0^{2\pi} f(x, u^*) \frac{1}{\left(\frac{dl}{dt}\right)} dl$$

$$\dot{\bar{\lambda}}^T = -\frac{1}{T}\int_0^{2\pi} \bar{\lambda}^T \frac{\partial f}{\partial x} \frac{1}{\left(\frac{dl}{dt}\right)} dl +$$

$$\frac{1}{T}\int_0^{2\pi} \frac{\partial\left(\frac{dl}{dt}\right)}{\partial x} \frac{\bar{\lambda}^T f}{\left(\frac{dl}{dt}\right)^2} dl - \frac{1}{T}\int_0^{2\pi} \frac{\partial\left(\frac{\partial l}{\partial t}\right)}{\partial x} \frac{\bar{\lambda}^T f}{\left(\frac{dl}{dt}\right)^2} dl \times \bar{\lambda}^T \bar{f}$$

-continued $$T = \int_0^{2\pi} \frac{1}{\left(\frac{dl}{dt}\right)} dl$$

These equations represent the equations of the dynamics of the state and of the adjunct state of the system.

$$\frac{\partial H}{\partial u} = \left(\frac{\partial f}{\partial u}\right)^T \lambda + \left(\frac{\partial L}{\partial u}\right)^T = 0$$

The solution of this equation gives, over time, the control u(t).

If H cannot be differentiated with respect to one or more of the control parameters—for example δ, a Boolean that controls the ignition of the engine—then the equation above is replaced by $\max_\delta(H(\delta=0), H(\delta=1))$.

$$x_k(t_0) \text{ given at } t_0 \text{ or } \lambda_k(t_0) = 0$$

$$\lambda(t_f) = \left(\frac{\partial \phi}{\partial x} + v^T \frac{\partial \Psi}{\partial x}\right) \text{ given at } t_f$$

$$\left[\frac{\partial \phi}{\partial t} + v^T \frac{\partial \Psi}{\partial t} + \left(\frac{\partial \phi}{\partial x} + v^T \frac{\partial \Psi}{\partial x}\right) f + L\right]_{t=t_f} = 0$$

if $t_f$ is free.

These equations represent the boundary conditions.

The solving of the optimal control problem according to Pontryagin's maximum principle is carried out by solving the preceding equations.

A third step 103 makes it possible to determine the state vector of the satellite. This determination may be carried out using a GPS (Global Positioning System) or an on-board orbit propagator. An on-board propagator gives the state vector of the satellite over time based on a model of evolution of the satellite implemented in the on-board computer. An orbit propagator is initialized by remote control from a ground station. This orbit propagator uses a precise model of the orbit dynamics of the satellite and may optionally be coupled to an inertial center placed on board the satellite.

Finally, a fourth step 104 makes it possible to determine a deviation between the state vector of the satellite and the predefined trajectory obtained in step 101. This deviation computation is carried out by projection of the state of the satellite onto the predefined trajectory and by the computation of the deviation with this predefined trajectory. This computation is performed by minimizing a norm of the deviation between the state and the reference state. The norms conventionally used are the norm $L1(\Sigma|x_i - x_{i\ ref}|)$ or the quadratic deviation: the norm $L2(\Sigma(x_i - x_{i\ ref})^2)$.

The method also comprises a fifth step 105 of determining the Lagrange multipliers λ(t). This determination is carried out based on the current state vector, on the deviation between the current state vector and the predefined trajectory determined in step 101 and on the parameters of the predefined control law determined in step 102. This determination is carried out using the equation:

$$\lambda(t) = \lambda_{ref}(t) + A(t) \times (x(t) - x_{ref}(t))$$

The method then comprises a sixth step 106 of determining the parameters of the control law of the engines. This determination is carried out by solving the control equation resulting from optimal control theory based on the state x(t) of the Lagrange multipliers λ(t). The control maximizes at all instants the Hamiltonian of the problem. The parameters of the control law of the engines comprise:

the direction of the engine thrust, the maximization of the Hamiltonian with respect to the direction of thrust obtained by solving the following equation:

$$\frac{\partial H}{\partial u} = \left(\frac{\partial f}{\partial u}\right)^T \lambda + \left(\frac{\partial L}{\partial u}\right)^T = 0$$

the ignition parameter of the engine δ, obtained by solving the following equation:

$$\max_\delta(H(\delta=0), H(\delta=1))$$

δ represents the Boolean determining if the engine is ignited (δ=1) or switched off (δ=0).

The sixth step 106 therefore makes it possible to obtain the direction of the engine thrust, as well as the ignition law of this thrust.

It should be noted that the choice of state variables and the use of filtering or averaging technique has a direct impact on the ease of representation and the parameterization of this data on board the satellite and the computation cost of the ecartometry module.

Specifically, it must be possible to store on board the state vector of the reference trajectory, the adjunct state vector and the sensitivity matrix A, that is 7+7+7*7=63 variables time-discretized with the time increment of the computer over the duration of the journey (several months); this represents a very large and expensive amount of memory storage for a satellite. Conventionally, these data tables are replaced by a polynomial representation that is a function of the time of these variables, it then suffices to store only the coefficients of the polynomial (a few tens of values depending on the order of the polynomial).

Figure 3:
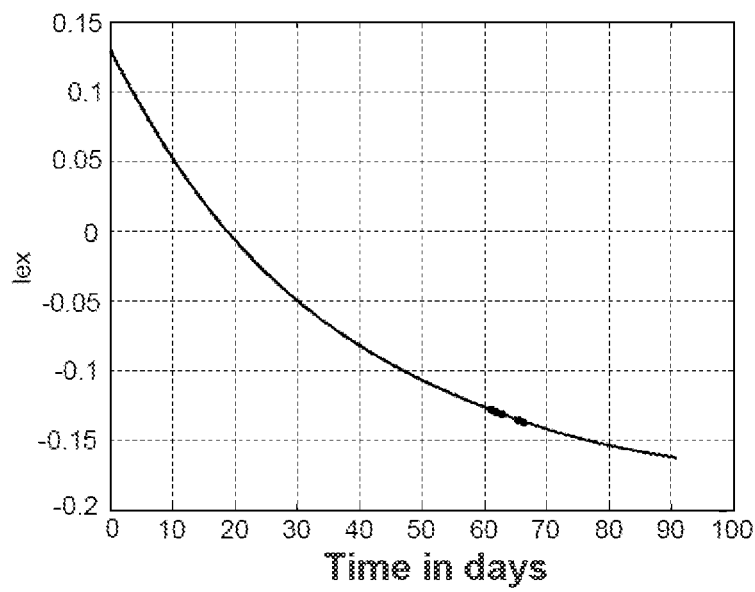
FIG. 3 shows the evolution of a parameter $\lambda_{ex}(t)$.

The curve in FIG. 3 representing the averaged parameter $\lambda_{ex}$ has a polynomial representation of the form $$\lambda(t) = 1532774 * t^6 + 18727.26 * t^5 - 28021.34 * t^4 - 3133.043 * t^3 + 792.0076 * t^2 - 189.1362 * t + 18.59838$$

with a correlation coefficient extremely close to 1: R2=0.9999190 this polynomial is a very good approximation of $\lambda_{ex}$ over the entire duration of the journey. Seven coefficients are enough to represent it.

Figure 4:
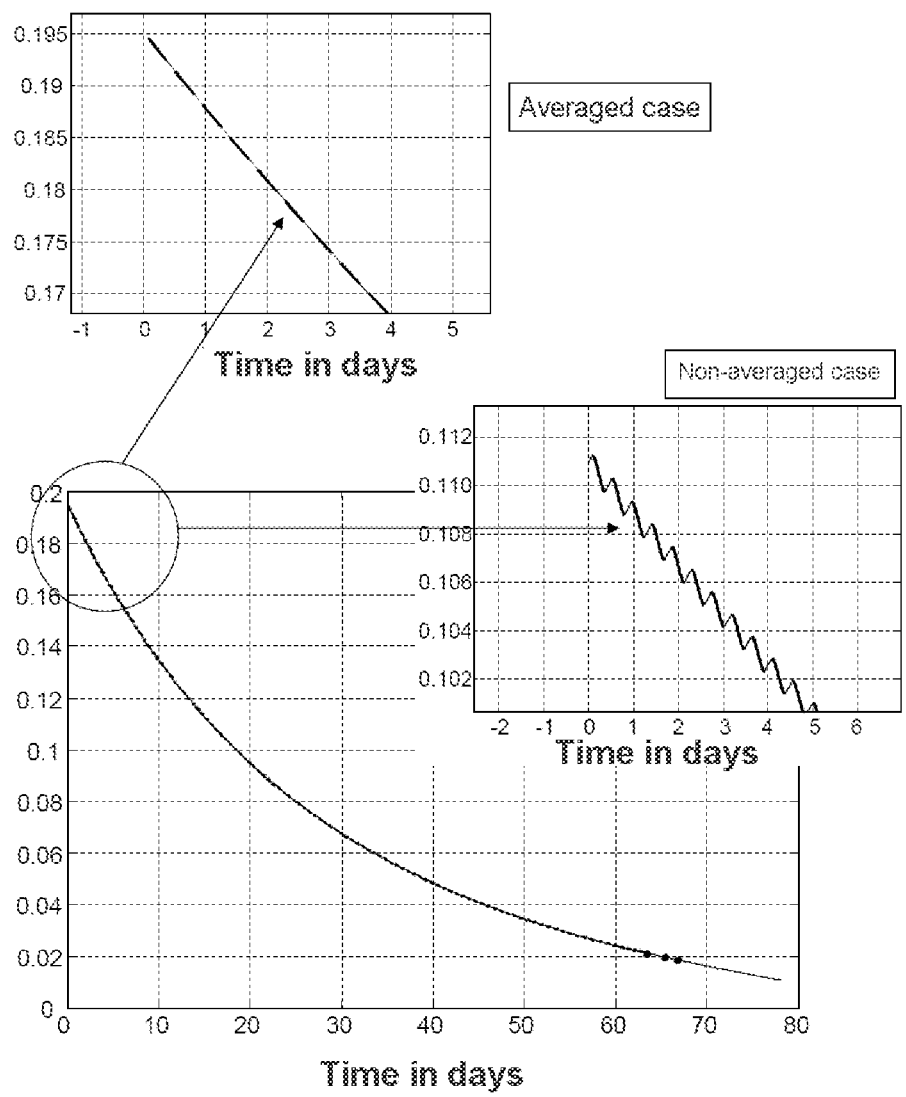
FIG. 4 shows the evolution of a parameter p.

However, if the dynamics are not averaged the polynomial representation becomes more difficult. FIG. 4 gives a glimpse of the problem over the evolution of the parameter p for a transfer of 200×35786 km, i=7° towards the geostationary orbit; the zoom on the take-off of the trajectory gives the evolution of p with or without prior averaging.

In the case of a conventional representation without prior averaging a single polynomial is not enough to represent p correctly over the whole trajectory because the solution of the problem is in practice oscillating; it will be necessary to break down the trajectory into small parts and use a model based on a polynomial by oscillation.

On the other hand, the search for the minimum distance of the current parameter p with respect to the nominal parameter p is complicated by the risk of seeing several local minima, and therefore several solutions, appear.

Next, a seventh step 107 makes it possible to control the engines, by using the parameters of the current control law obtained during the sixth step. This control of the engines makes it possible to trigger the motion of the satellite. This motion of the satellite, is, moreover, affected by various external disturbances (for example solar radiation pressure, harmonic of the Earth's potential, lunisolar attraction, etc.) or internal (for example errors on the production of the engine thrust).

Following the control of the engines, the method then loops back to the third step 103 of determining the satellite state vector. The method stops when the final target orbit is reached with the desired precision for the stationing mission.

The system implementing this method is a satellite comprising at least one engine. The engine control method may for example be implemented on a generic processor, a dedicated processor, or an FPGA (Field Programmable Gate Array).

Moreover, the method may be available as a computer program product on a computer-readable medium. The medium may be electronic, magnetic, optical, electromagnetic, or may be an infrared broadcasting medium. Examples of such media are semiconductor memories (Random Access Memory RAM, Read-Only Memory ROM), tapes, diskettes or magnetic or optical disks (Compact Disk-Read Only Memory (CD-ROM), Compact Disk-Read/Write (CD-R/W) and DVD).

The invention claimed is:

1. A method for stationing a satellite, characterized in that it comprises:
   a first step of determining a predefined trajectory used for said stationing of said satellite based on a model of movement of said satellite;
   a second step of determining parameters of a predefined control law of approximation of said predefined trajectory and minimizing an impact of said predefined control law on a deviation from a real trajectory followed by said satellite using said parameters of the predefined control law, with respect to said predefined trajectory;
   and the following iterative steps:
   a third step of determining a state vector of said satellite;
   a fourth step of determining a deviation between said state vector of said satellite and said predefined trajectory;
   a fifth step of determining Lagrange multipliers based on a current state vector of said satellite, on a deviation between said current state vector and the predefined trajectory and on said parameters of the predefined control law;
   a sixth step of determining the parameters of a current control law of engines based on said Lagrange multipliers and by derivation of a parameter representative of an effect of the engines on said real trajectory; and
   a seventh step of controlling the engines based on said parameters of the current control law, wherein the predefined trajectory is not modified while the satellite is being stationed.

2. The method according to claim 1, in which said parameters of said predefined control law and said predefined trajectory are stored in a form of a polynomial representation.

3. The method according to claim 1, in which said first step and said second step of determining use an averaged model of the movement of said satellite.

4. The method according to one of claim 1, in which said first step is configured to use a Cartesian model of the movement of said satellite.

5. The method according to claim 1, in which said first step is configured to use a Keplerian model of the movement of said satellite.

6. The method according to claim 1, in which said first step is configured to use an equinoctial model of the movement of said satellite.

7. A satellite comprising at least one engine and engine control means configured to:
   determine a predefined trajectory used for stationing of said satellite based on a model of movement of said satellite;
   determine parameters of a predefined control law for approximation of said predefined trajectory and by minimizing an impact on said predefined control law for a deviation from a real trajectory followed by said satellite using said parameters of the predefined control law, with respect to said predefined trajectory;
   determine a state vector of said satellite;
   determine a deviation between said state vector of said satellite and said predefined trajectory;
   determine Lagrange multipliers based on a current state vector of said satellite, on a deviation between said current state vector and the predefined trajectory and on said parameters of the predefined control law;
   determine parameters of a current control law of engines based on said Lagrange multipliers and by deriving a parameter representative of an effect of the engines on said real trajectory; and
   control the engines based on said parameters of the current control law, wherein the predefined trajectory is not modified while the satellite is being stationed.

* * * * *